Oct. 3, 1961  M. R. MORASCH  3,002,513
BURNERS FOR COOKING RANGES AND VENTILATING MEANS THEREFOR
Filed June 8, 1959  3 Sheets-Sheet 1
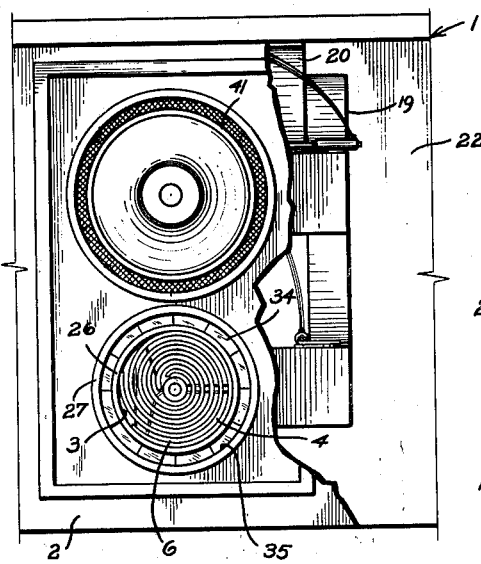
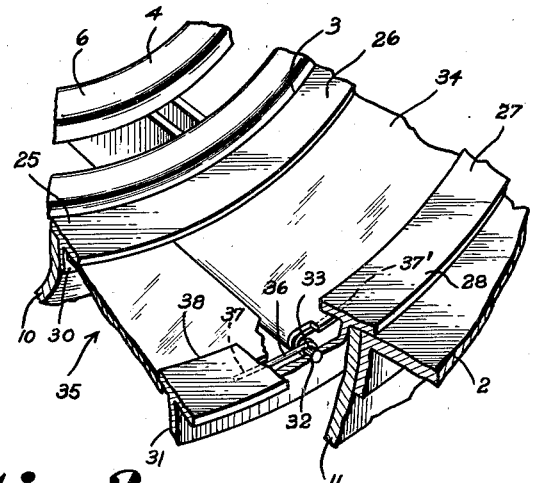
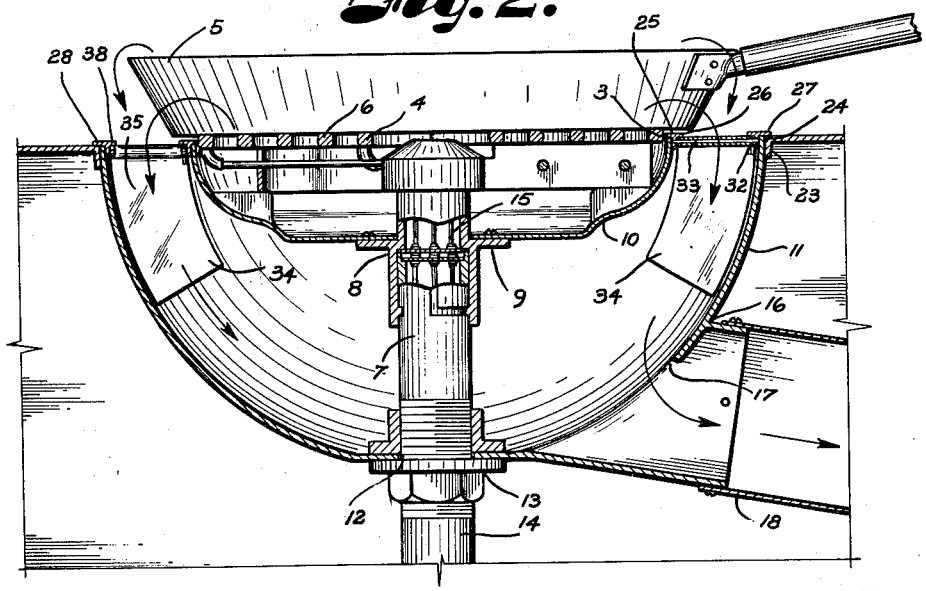
INVENTOR.
Merle R. Morasch.
BY
ATTORNEYS.

Oct. 3, 1961　　　M. R. MORASCH　　　3,002,513
BURNERS FOR COOKING RANGES AND VENTILATING MEANS THEREFOR
Filed June 8, 1959　　　3 Sheets-Sheet 2
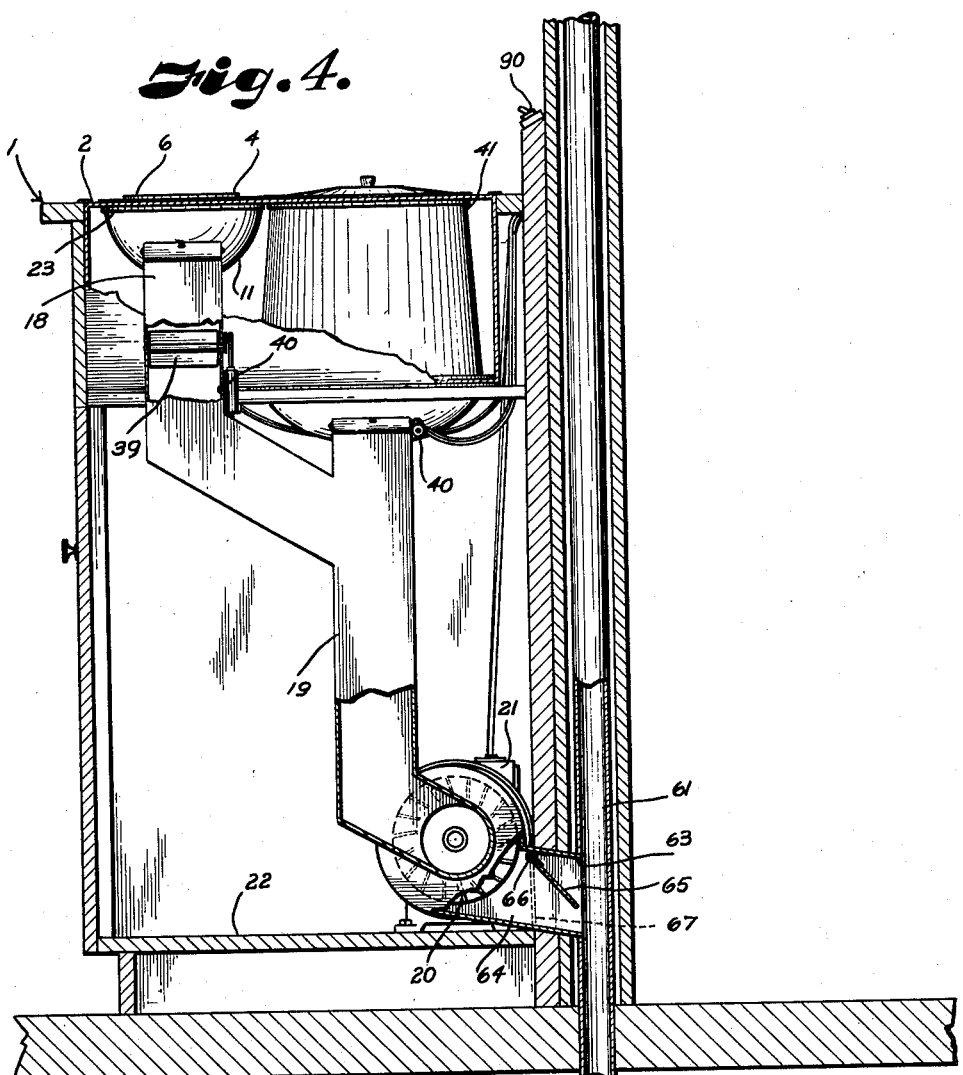
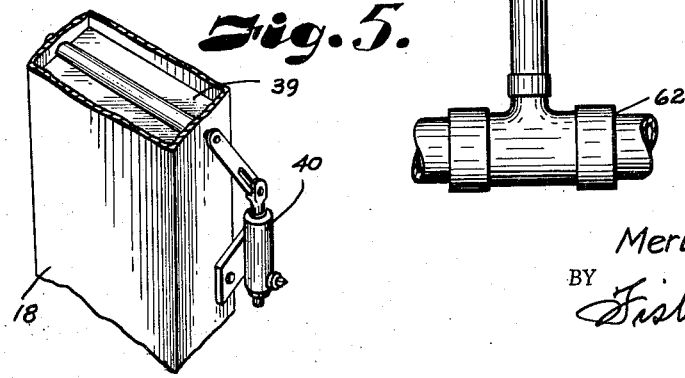
INVENTOR.
Merle R. Morasch.
BY
ATTORNEYS.

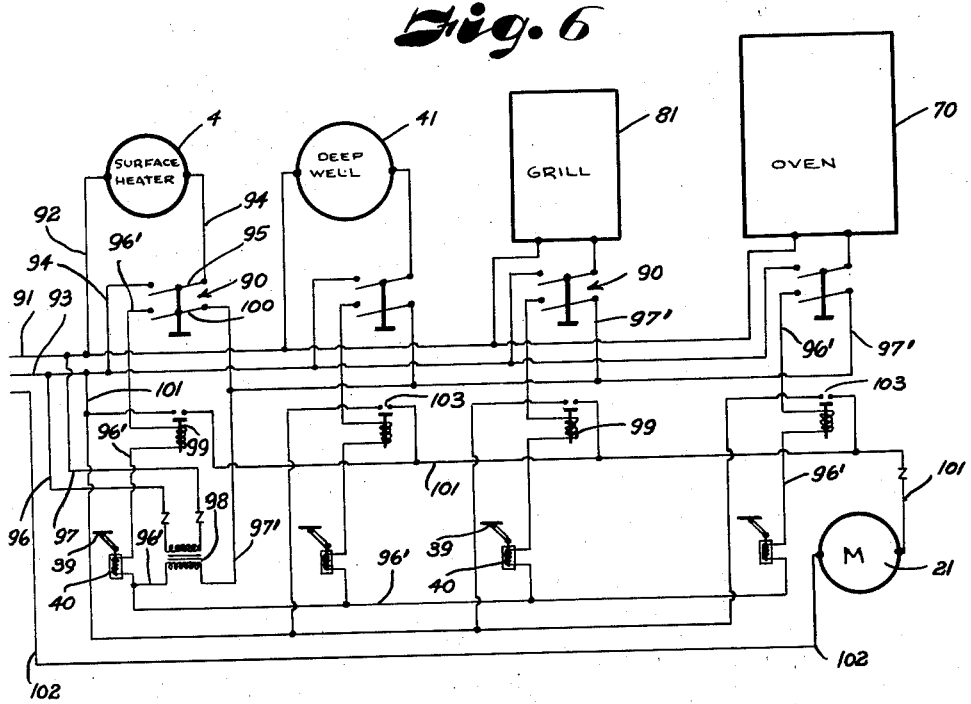
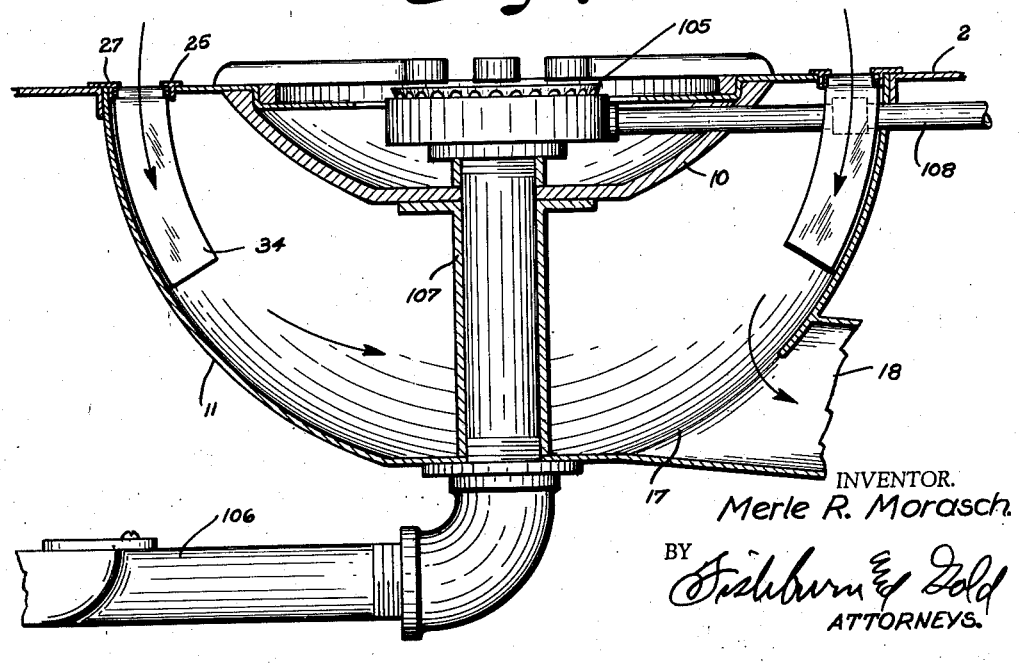

United States Patent Office 3,002,513
Patented Oct. 3, 1961

3,002,513
BURNERS FOR COOKING RANGES AND VENTILATING MEANS THEREFOR
Merle R. Morasch, 2017 Quindaro, Kansas City, Kans.
Filed June 8, 1959, Ser. No. 818,936
3 Claims. (Cl. 126—299)

This invention relates to burners for cooking ranges and ventilating means therefor, and more particularly for removing odors from cooking ranges, as well as preventing heat from permeating the room in which the range is used.

Various means have been attempted to dispose of cooking odors and vapors from cooking ranges during use to prevent the grease components and vapors from settling on the walls, draperies, curtains and the like in the room in which the range is used. The most commonly used are hoods over the entire range, and other attempts have been made to pull the air from between the heaters or burners, none of which have met with commercial success for use in modern domestic kitchens.

The principal object of the present invention is to provide a bowl under the heating elements of the cooking range, the deep well, grill and oven, whereby odors, as well as heat, around the heaters or burners will be withdrawn from the room, thus eliminating the moisture, grease and other undesirable components from settling in the room, and to dispose of the same to atmosphere outside the room or to the sewer vent.

Other objects of the present invention are to provide a motor-driven, turbine-type suction pump to withdraw the odors and other undesirable components from the cooking range to a place of disposal; to provide ducts through which the undesirable components are drawn; to provide each individual heater or burner, well, oven or the like with a vent having a valve which will automatically close when the heater, well, or oven is shut off; to provide the bowl of the heater or burner with a wall spaced from the inner wall closely surrounding the heater or burner; to provide the bowl with closure members whereby the bowl will automatically be closed at the top when the heater or burner is shut off; and to provide electrical connections to the heaters whereby when the heaters are turned on the turbo-type suction pump will automatically be operated to remove the undesirable components from the heaters.

Still further objects of the invention are to provide ducts leading from the heaters or burners of the cooking range to connect with the sewer vent for disposing of moisture withdrawn from the cooking range; and to provide the vent connected with the sewer vent with a valve for preventing undesirable odors from the sewer vent pipe to return to the kitchen.

Still further objects of the invention are to provide solenoid means for automatically operating the butterfly valves in the individual vents leading from the burners; and to provide a device of this character simple and economical to manufacture.

In accomplishing these and other objects of the invention I have provided improved details of structure, the preferred forms of which are shown in the accompanying drawings, wherein:

FIG. 1 is a fragmentary top plan view particularly illustrating the electric heater and deep well of a cooking range.

FIG. 2 is an enlarged cross-sectional view through the electric heater particularly illustrating the bowl with the closure flaps or vents in open position surrounding the cooking unit.

FIG. 3 is an enlarged fragmentary perspective view particularly illustrating the hinge of the closure flaps.

FIG. 4 is a cross-sectional, partly fragmentary view of the heater and deep well with the vent leading to the turbo-type pump and showing the vent connected to a sewer vent.

FIG. 5 is an enlarged fragmentary perspective view of the solenoid for operating the butterfly valve.

FIG. 6 illustrates a wiring diagram for automatically operating the heaters and energizing the motor for operating the suction pump.

FIG. 7 illustrates a gas-type burner with the gas entering vertically from the bottom of the burner and the bowl surrounding the same.

Referring more in detail to the drawings:

1 designates a cooking range embodying the features of my invention consisting of a top planar work surface 2 extending over the entire open cooking surface area and having an opening 3 for a surface heater 4 of electric type with a cooking utensil 5 thereon (FIG. 2). The heater 4 is provided with the usual coils 6 upon which the utensil rests. The heater 4 is supported substantially in the plane of the work surface 2 by a hollow stem 7 having a connection 8 provided with flanges 9 to which is attached a cup-shaped wall 10 having an upwardly extending edge portion 10' closely adjacent the coil 6 of the heater and terminating substantially in the plane of the work surface 2. The wall 10 forms a receiving chamber 10" in which the heater 4 is located.

A wall 11 is spaced from the wall 10 and is also of cup or bowl shape forming a chamber 11' in which the wall 10 is located. The wall 11 has an opening 12 in its bottom which surrounds the stem 7 and has a coupling member 13 secured thereto, and a tube 14 extends downwardly therefrom through which the electric wires 15 to the heater extends. One side 16 of the wall 11 of the bowl is provided with an opening 17 and a vent line or pipe 18 is secured thereto surrounding the opening and leads to a suction apparatus 18' (FIG. 6) comprising a main duct 19 connected to a turbo-type suction pump 20 having a motor 21 connected therewith, both of which are mounted on the bottom 22 of the stove, as best illustrated in FIG. 6.

The top work surface 2 of the range has a downwardly turned flange 23, and the upwardly extending edge portion 24 of the wall 11 is engaged and retained on the inside thereof substantially in the plane of the work surface 2 and surrounding the heater 4. The upper edge of the wall 10 is surrounded by a flange 25 of a ring member 26 T-shaped in cross section, and a substantially T-shaped circular member 27 has one flange 28 engaging over the upper edge of the bowl 11 and over the top work surface 2 of the stove, as indicated in FIG. 2.

The downwardly extending legs 30 and 31 of the substantially T-shaped members 26 and 27 are provided with aligned openings 32 for receiving pins or the like 33 upon which are pivotally mounted closure members or flaps 34 which act as a valve for closing the entrance 34' to the vent space 35 formed between the walls 10 and 11 and surrounding the heater when the suction apparatus 18' is not in use. Wire spring members 36 engage the pins 33 and have their free ends 37 and 37' engaging underneath the flange 38 of the T-shaped members 27 and underneath the closure members 34 to exert tension on the closure members to hold them in closed position when the heater is turned off as shown in FIG. 3.

Each vent 18 of the heaters is provided with a valve 39, here shown to be of butterfly type, operated by solenoid 40 (FIG. 5), as will later be described.

In FIGS. 1 and 4 I have shown a deep well 41 adjacent the heater 4.

In FIG. 4 I have illustrated a sewer vent pipe 61 having connection with a sewer line 62. The pipe is provided with an opening 63, and connected thereto is a vent line or duct 64 connected with the turbo-type suction pump 20. The vent 64 is provided with a valve flap 65 mounted in the upper wall thereof by a shaft or the like 66 which will open when air is moved towards the vent pipe 61 and will close when the pump 20 is not in operation as at 67 (FIG. 4) to prevent odors from the sewer line 62 from entering the vent lines 18 and 19. I do not wish to be limited in this form of disposal of the undesirable odors and other matter from the cooking range, as it may be vented direct to atmosphere if desired.

In FIG. 6 I have illustrated a schematic diagram of electric wiring for the heater 4, deep well 41, and an oven 70 and grill 81. Since each cooking unit is operated in an identical manner only one operation will be described. In the present structure I provide each unit with a double-pole switch 90 to control the individual unit and the automatic disposal in one simple operation. A conductor 91 having branches 92 leads from an electrical source to each unit. Conductor 93 connects through branches 94 over switch 90 to the other side of the units whereby closing of switch 90 will connect the pole 95 and close the circuit to energize the desired unit.

The conductors 91 and 93 have branches 96 and 97 leading to a small step-down transformer 98 (110 volts to 24 volts or 220 volts to 32 volts) adapted for flexibility of controlling the different units at low cost and for compactness in free standing ranges or built-in units. A wire 96' leads from the transformer to the solenoid 40 operating the vent valves 39 for each unit and to electrical valve contact units 99, also of the solenoid type, regulating the current to the motor 21 for operation of the suction pump 20. The conductor 96' then continues to pole 100 of switch 90. A conductor 97' leads from the transformer to the double-pole switch 90 to complete the circuit for operation of the controls 40 and 99 at the same time as the cooking unit is energized.

A branch 101 leads from the conductor 93 to one side of the motor 21 and a return or a grounding wire 102 from the motor as is the usual practice. Branch 101 is interrupted at each valve contact unit 99, as at 103, whereby operation of a valve contact unit will close the circuit to motor 21, which in turn will operate the pump 20 for suction of air from the respective cooking unit.

Suction from the pump will cause the closure flaps 34 mounted in the space surrounding the heaters to open or assume the position shown in FIG. 2 to withdraw heat from around the heaters, and when the cooking utensil 5 is placed thereon the heat and odor escaping from around the utensil will flow through the bowl underneath the heater 4, and the odors, moisture, grease and the like from the cooking utensil will be drawn through the bowl, through the ducts 18 and 19, through the pump 20, and thence blown through the duct 64 to the sewer vent 61 and the moisture therein dropping to the sewer pipe 62. The air from the pump will cause the valve 65 to open as shown in FIG. 4. Turning the switch 90 to "off" position will stop the motor and suction pump, and cutting off of the air will allow the closure flaps 34 to assume the position shown in FIG. 3 due to the wire hinge member 33. At the same time the valve 65 will close and the solenoid will be de-energized, thus allowing the butterfly valve 39 to close.

The electric current will be supplied through a source of supply (not shown), and a timing mechanism may be operated by an electric clock (also not shown) with a line ahead of the present electric lines 91 and 93 for controlling the current to the individual switches 90. The switches 90 may be of a type whereby a first step operation will first energize the cooking unit and further operation of the switch will then energize the odor disposal thus providing two separate operations.

It will be obvious that operation of the deep well, grill and oven from the diagram shown in FIG. 6 will be the same as described in connection with the burner 4, and the wiring hookup is such that each one may be operated individually and independent of each other. If desired, the wiring for the electric valve contacts may be eliminated and have a straight line voltage to the turbo-pump motor.

In FIG. 7 I have illustrated a gas burner 105 with the gas supplied through line 106 vertically through tube 107 with a bowl structure 107' similar to but of slightly different shape than that formed by wall 10 described in connection with heater 4. The burner 105 is provided with a gas pilot light as is the usual practice, and gas for the pilot light is supplied through tube 108. The operation of the gas burner to withdraw the undesirable fumes, odors and other components from around the burners through the automatic odor disposal as previously described would be from a direct connection of the turn-on (not shown) of the gas burner with the switch 90, or could be through a separate switch connection on the stove or wall (not shown) which would turn on the odor disposal unit at the will of the operator.

It will be obvious from the foregoing that I have provided an improved heater or burner arrangement having a bowl underneath thereof connected with vents for carrying off undesirable air borne components from around the cooking unit to a place of disposal which is simple and readily installed in a cooking range or other cooking items wherein the space around and directly underneath the heater burner will carry away the heat as well as odors, fumes and other undesirable components to the place of disposal.

What I claim and desire to secure by Letters Patent is:

1. In combination with a cooking range having a top planar work surface extending substantially over the entire open cooking surface area and having at least one heating element positioned substantially in the plane of said work surface; means for withdrawing undesirable air borne components produced during the use of said element, said means including a cup-shaped first wall positioned beneath said element and having an upwardly extending edge portion terminating adjacent said element and substantially in the plane of said work surface, said first wall forming a chamber for receiving said element; a second wall spaced from said first wall and forming with said second wall a vent space therebetween, said second wall terminating in an upwardly extending edge portion; means retaining said second wall edge portion substantially in the plane of said top work surface and forming an entrance to said vent space located in the plane of said work surface and which at least partially surrounds said element, said second wall having an opening in one side thereof; a vent pipe communicating with said second wall opening, and suction means communicating with said vent pipe for causing undesirable air borne components to be drawn downwardly through said vent space and through said vent pipe to a place of disposal.

2. The apparatus of claim 1 including valve means pivotally mounted between said first and second walls at said entrance to said vent space.

3. The apparatus of claim 1 including means for simultaneously energizing said element and said suction means.

References Cited in the file of this patent

UNITED STATES PATENTS

| | | |
|---|---|---|
| 1,899,704 | Lutz | Feb. 28, 1933 |
| 2,076,479 | O'Connell | Apr. 6, 1937 |
| 2,085,511 | Ross | June 29, 1937 |
| 2,337,301 | Phares | Dec. 21, 1943 |
| 2,674,991 | Schaefer | Apr. 13, 1954 |
| 2,836,114 | Weaver | May 27, 1958 |
| 2,870,829 | Williams | Jan. 27, 1959 |
| 2,908,267 | Hess | Oct. 13, 1959 |